United States Patent [19]

Turton

[11] Patent Number: 4,905,929
[45] Date of Patent: Mar. 6, 1990

[54] CORE MATERIAL

[75] Inventor: Philip J. Turton, Leatherhead, England

[73] Assignee: Bristol Composite Materials Engineering Ltd., Bristol, United Kingdom

[21] Appl. No.: 844,669

[22] Filed: Mar. 27, 1986

[30] Foreign Application Priority Data

Apr. 4, 1985 [GB] United Kingdom ............... 8508965

[51] Int. Cl.$^4$ ........................................... B65H 49/18
[52] U.S. Cl. ................................... 242/140; 118/419; 118/420; 242/157 R
[58] Field of Search ........................ 242/140, 157 R; 118/419, 420

[56] References Cited

U.S. PATENT DOCUMENTS

| 3,345,231 | 10/1967 | Gidge et al. | 156/181 |
| 3,616,159 | 10/1971 | Hamp | 161/128 |
| 3,989,789 | 11/1976 | Brookhart | 264/136 |

FOREIGN PATENT DOCUMENTS

| 741997 | 5/1970 | Belgium . |
| 1193227 | 5/1965 | Fed. Rep. of Germany . |
| 1559464 | 9/1969 | Fed. Rep. of Germany . |
| 1635669 | 6/1975 | Fed. Rep. of Germany . |
| 2522027 | 2/1982 | France . |
| 2004835 | 4/1979 | United Kingdom . |

Primary Examiner—James J. Bell
Attorney, Agent, or Firm—Morgan & Finnegan

[57] ABSTRACT

A machine suitable for fabricating a core material of resinated filaments has a frame having attachment points for filaments arranged linearly and a number of rods spaced apart and substantially parallel to the attachment points. The rods have one or more holes capable of receving a filament, and the rods are capable of displacement parallel to the plane of the attachment points. There is also a filament supply for passing filament from the attachment points via the rods, and a set of formers having pins capable of being located between the separated filaments following displacement by the rods. By operation of the machine and successive insertion of former, a shaped openwork structure of resinated filaments may be fabricated and which may be cured to produce the core material.

12 Claims, 8 Drawing Sheets

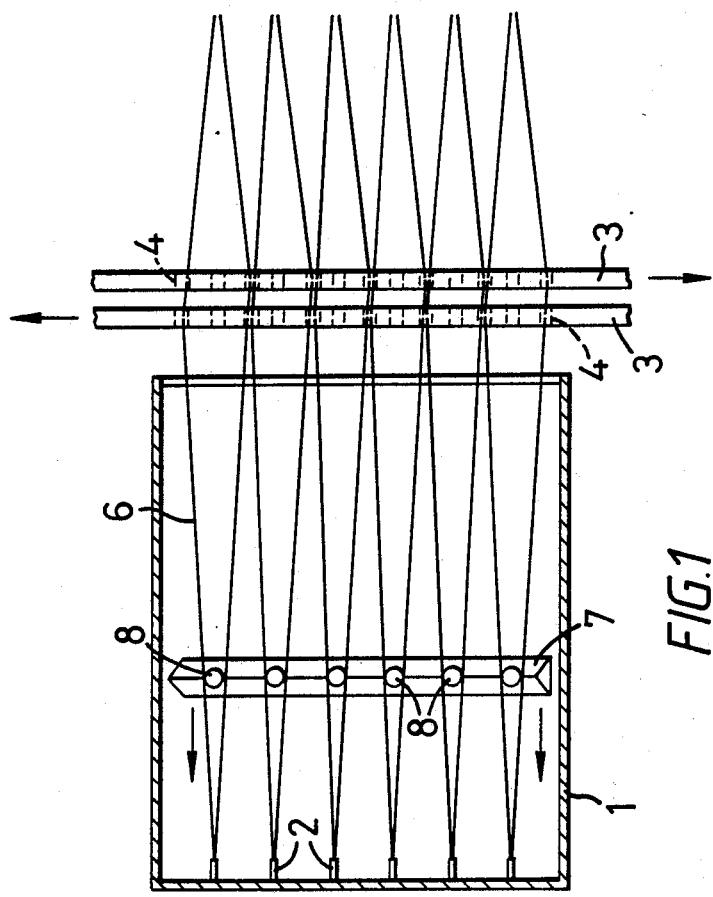

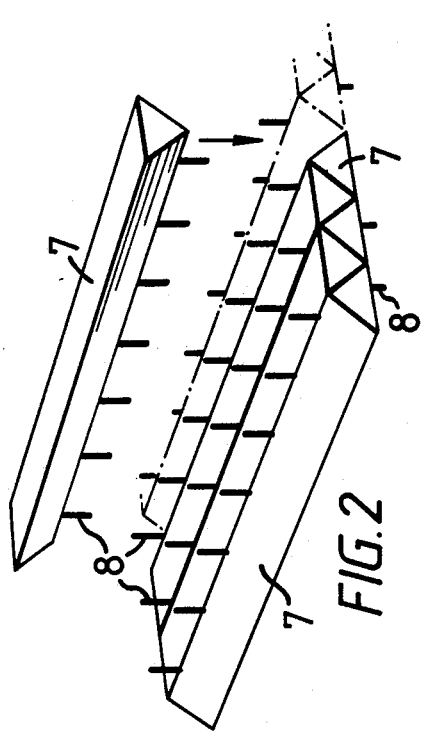
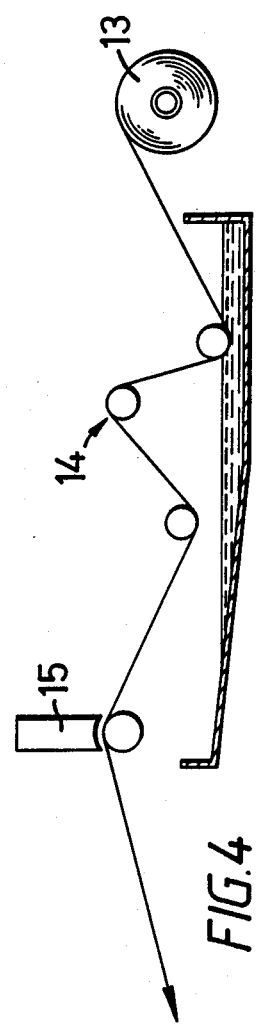

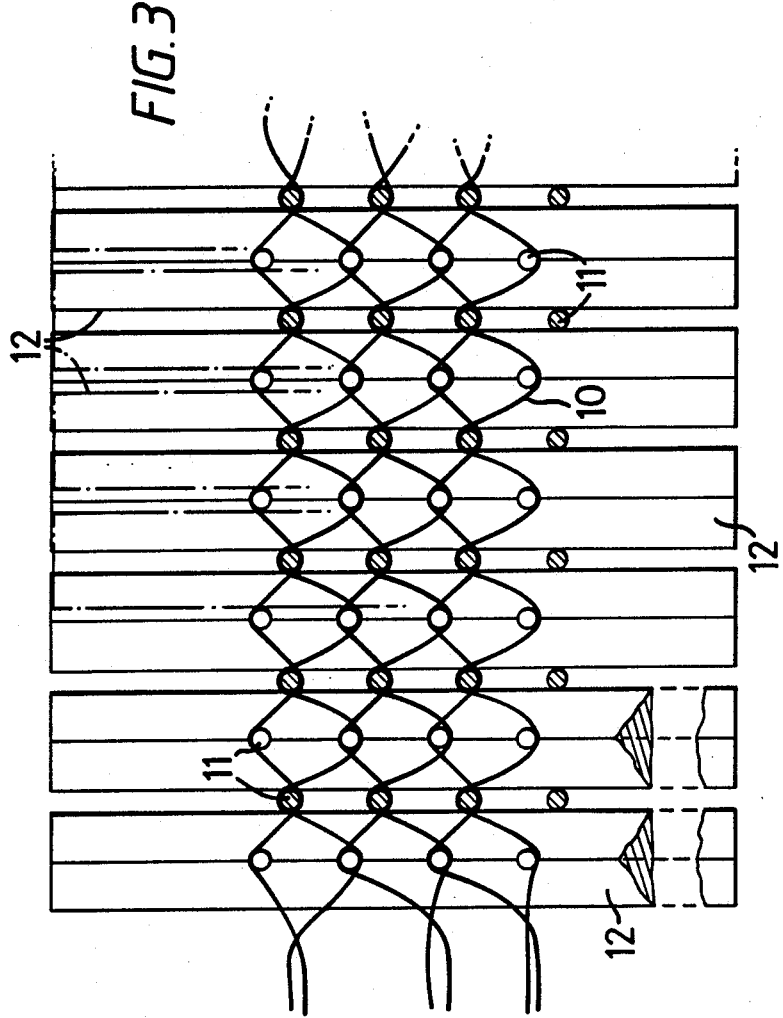

CORE MATERIAL

The present invention relates to laminar structures of generally high strength and low weight and more particularly to open-work core material for such structures.

It is known to use honeycomb core material for constructional panels and aircraft structures. The honeycomb core, e.g. aluminium, is constructed from a plurality of generally sinusoidal shaped sheets or ribbons which are bonded together at the nodes of adjacent ribbons to form generally hexagonal shaped cells. A laminate having such a core material can be used as a constructional panel.

Honeycomb core material has a number of associated disadvantages for certain applications. Thus the closed cell configuration can allow water or condensation build up. Also, it has disadvantages when required for fabrication of curved or contoured structures and it has cost disadvantages.

Core material may also be made by the systematic winding of a resin impregnated strand about a former of the required shape as disclosed in GB patent 2004835 B. However this process has certain disadvantages of speed of fabrication and cost.

The present invention relates to an apparatus for fabricating a core material, a process for fabricating the core material, the core material and structures comprising the core material.

Thus according to the present invention there is provided a machine suitable for fabricating a core material of resinated filaments comprising a plurality of filament locating means arranged in a substantially linear manner, a plurality of rods spaced apart and substantially parallel to the filament locating means, the rods having one or more holes capable of receiving a filament, the rods being capable of displacement parallel to the plane of the filament locating means, a filament supply for passing filament from the filament locating means via the rods. For use with the machine there are means for maintaining the separation of the displaced filaments which preferably comprise a set of formers having pins capable of being located between separated filaments upon displacement by the rods, the formers preferably being shaped for close packing.

The filament is preferably dispensed from reels of suitable material, for example, glass fibre and prior to emerging from the nozzle is passed through a chamber or the like containing the wetting liquid. The chamber is preferably adapted with bars to encourage spreading and hence complete wetting of the filament. The quantity of liquid may be metered onto the filaments by passing through a die which removes the excess in a controlled manner.

The wetting liquid is preferably a polyester resin, organic or chemical glues, paints, plastics materials, epoxy resin, phenolic resins, inorganic resins or compounds.

The filaments are preferably glass fibre, carbon fibre, Kevlar aramid fibre, textile rovings, or filaments of metal.

The invention also includes a process for fabricating an open work core material by use of a machine as hereinbefore described and also open work structures obtainable by the process.

The open work structures may be used as a core material for structures such as panels in which the core material is sandwiched and bonded between sheets of suitable material.

The invention will now be described by way of example only and with reference to FIGS. 1 to 14 of the accompanying drawings.

FIG. 1 is a schematic diagram of a machine for fabricating open work structures.

FIG. 2 is a schematic diagram showing the configuration adopted for five close packing bevelled formers with a further former in process of insertion.

FIG. 3 is a schematic diagram of the open work structure during the fabrication process.

FIG. 4 is a vertical section through the apparatus used for resinating the fibres.

Figure 5:
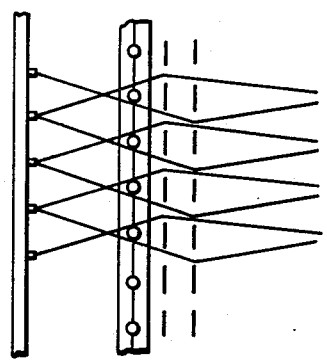
FIGS. 5 to 10 are schematic diagrams illustrating the stages in the build up of the open work structure.
Figure 6:
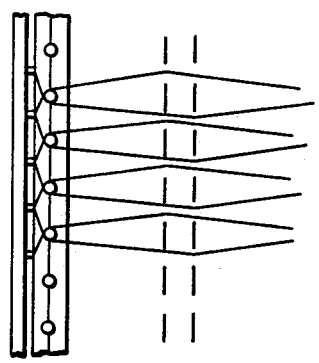
Figure 7:
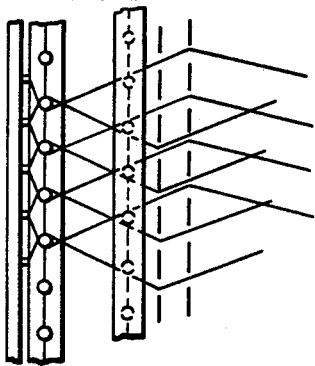
Figure 8:
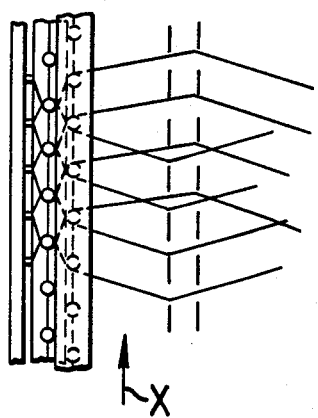
Figure 9:
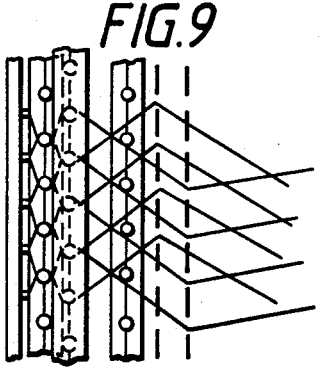
Figure 10:

A framework (1) is provided with a number of filament locating means or attachment points (2) along one side, the attachment points being vertically spaced apart. At the opposite end of the framework are located rods (3) capable of up and down movement. Each rod carries holes (4) capable of passing a filament or roving (6). The rods (3) are in the same plane as the framework (1) and are adapted so that one rod can move up whilst the other rod moves down. In one embodiment, the machine has a pair of frameworks, each associated with four rods, each rod carrying ten holes.

A filament or roving resinating system provides wetted fibres from the apparatus. The system comprises a feed or dispensing reel 13 of glass fibre from glass fibre reels. The rovings are passed through a tensioning device 14 prior to passing through the rods to the filament attachment points. The filament passes through one or more coating baths containing resin. The use of bars enables better wetting of the glass fibres by the resin. A wiper 15 may be used to remove excess resin from the fibres. (FIG. 4).

The fabrication of the open work structure is carried out as follows. Resinated rovings are passed over a tensioner. Each bundle of rovings is located and passed through the separate holes (4) of the two rods (3). Each bundle is then fastened to filament attachment points, two bundles per attachment point.

The rods (4) initially are at the same height and with the holes (4) of each rod at the same vertical level. One rod is then displaced upwards and the other rod displaced downwards. This movement of the rod causes the rovings within the framework to be displaced as shown in FIG. 1.

A bevelled former (7) carrying evenly spaced pins (8) is then used to separate the rovings. The former (7) is moved so as to place a pin (8) between each separated pair of rovings and is then clamped against the framework (1) and close to the filament attachment points (2). The rods are then again displaced so that the one rod moves down and the other rod moves up. Thus causes the rovings to wrap around the pins of the former and to again cause roving separation. A second former is then placed at the opposite side of the rovings from the first former so as to place its pins between separated rovings. The second former is then clamped. It is desirable that the formers are bevelled or otherwise shaped so that they are capable of close packing with each other.

The above movement of rods and clamping of formers is repeated as necessary to form a length of open work material. The upright is moveable so as to enable more formers to be slid through the framework. The whole structure may then be cured in an oven or by use of say photosensitive resins to form a rigid structure. The formers may be treated with a release agent to facilitate their removal subsequent to curing. The resultant open work structure may be used as a core material for structures such as panels, doors etc, the core material being sandwiched and bonded between outer sheets of suitable material.

FIG. 2 shows the configuration adopted for five close packed bevelled formers, shows the bevelled or triangular cross section formers have vertical pins along one edge.

FIG. 3 shows the configuration of an open work structure during fabrication. The filaments (10) are wrapped around the pins (11) of the former (12) and each former displaces the filaments into and out of the plane of the paper. This results in an three dimensional open work structure.

The final shape of the open work structure may be varied by modification of the manufacturing method. Thus the thickness of the structure, the thickness of the cured rovings, the density of nodes and the angles of the rovings may all be varied as required by changing the former or pin dimensions or other parameter.

FIGS. 5 to 10 are schematic diagrams illustrating the stages in the build up of the open work structure.

Figure 11:
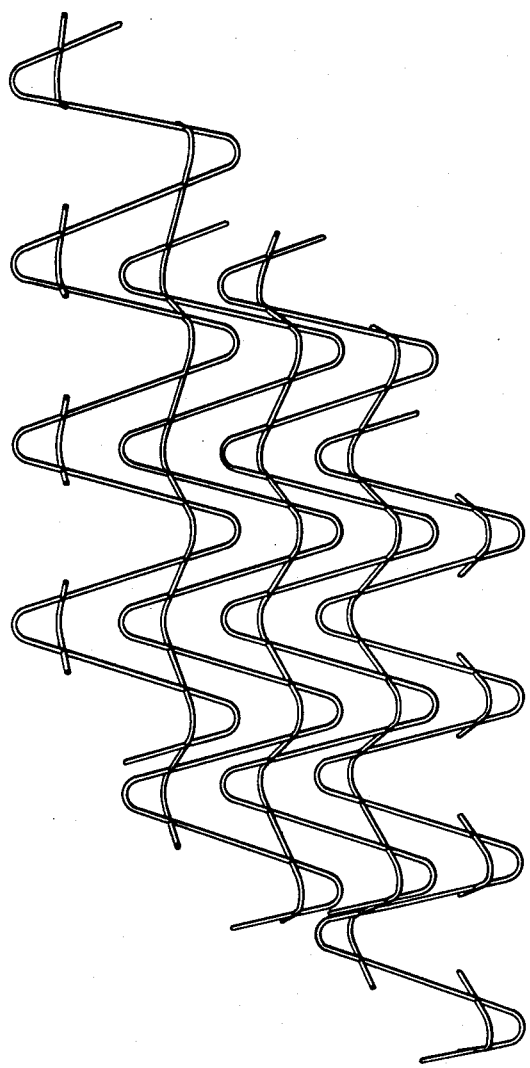
FIGS. 11 to 14 are perspective diagrams of various configurations of open work material fabricatable by the machine.
Figure 12:
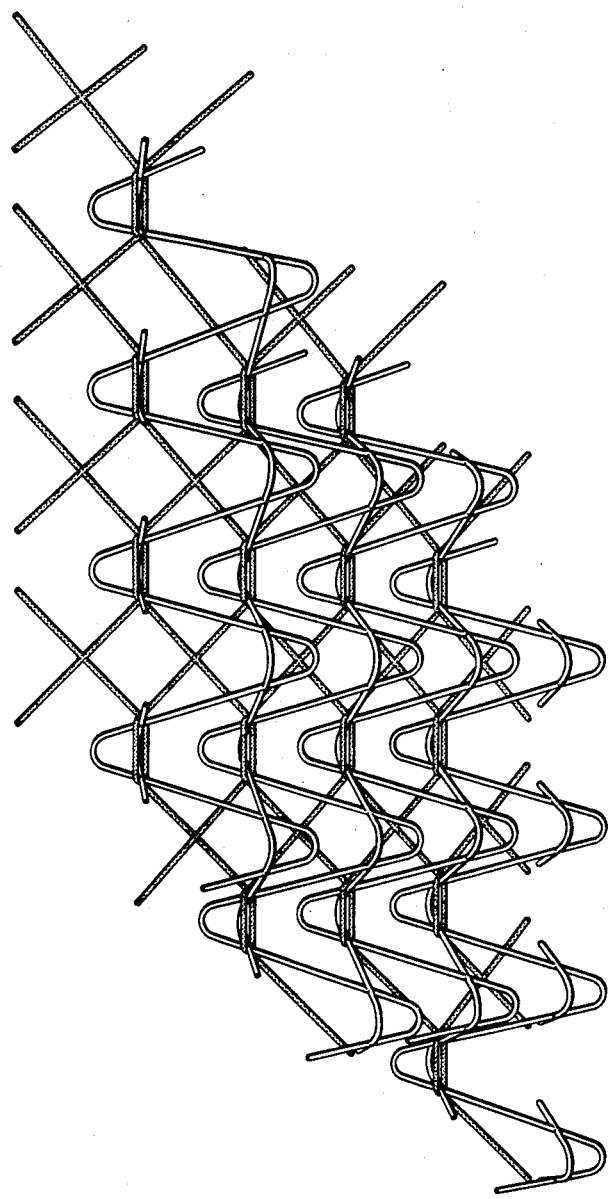
Figure 13:
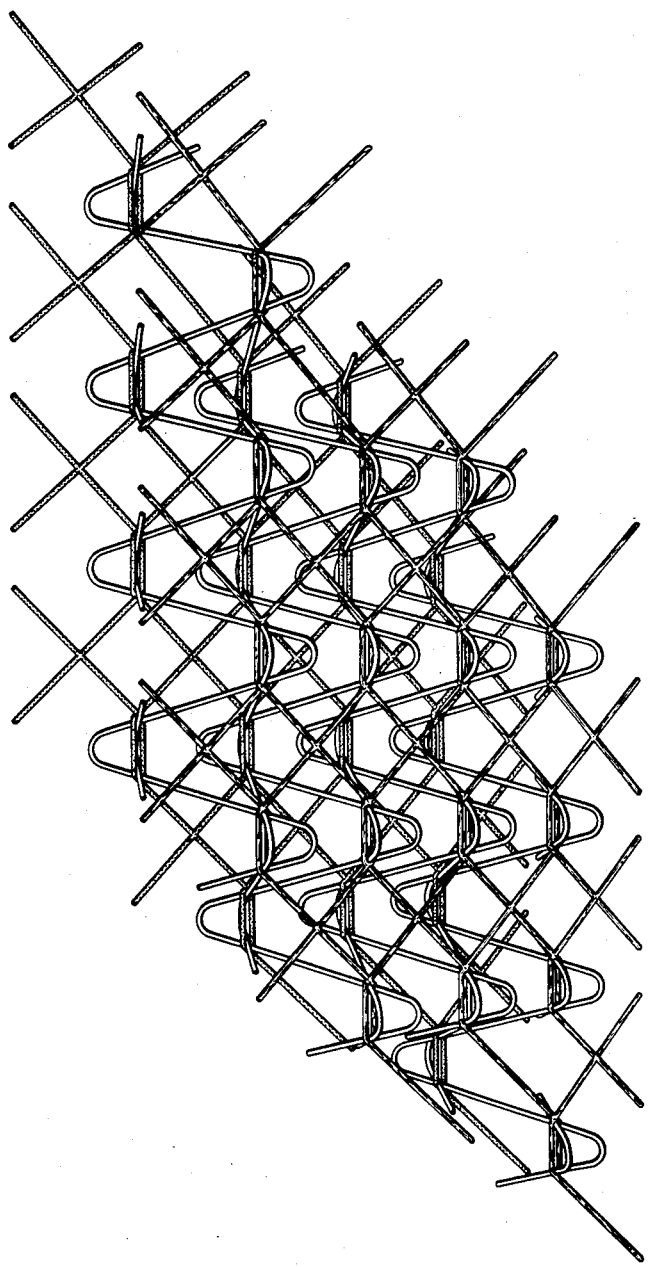
Figure 14:
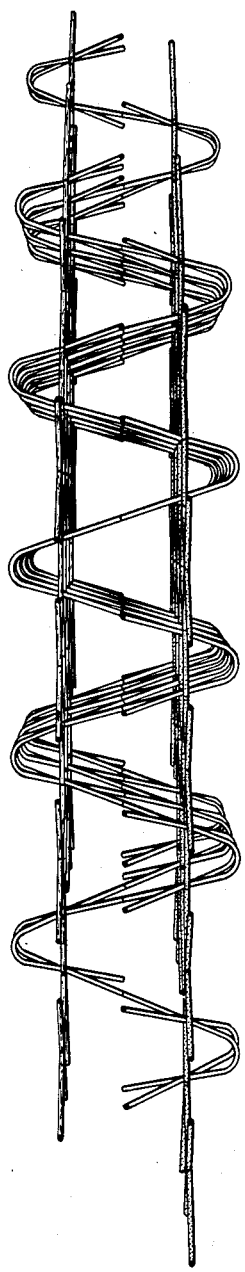

As a further embodiment of the invention, additional fibres may be incorporated to connect the nodes on one or both faces. This arrangement tends to give improved bending stiffness to the core material. The additional fibres may be the same or different from the initial structure. Thus, subsequent to the curing process, the initial structure may be bent or distorted into a desired configuration, the additional fibres being wound, for example by hand, into the structure, the resin being cured thus resulting in a structure having the permanent desired configuration e.g. a complex double radii curved surface. FIG. 11 shows a schematic diagram of the cured initial structure following removal from the formers. FIG. 12 shows the critical structure having a single lower layer of additional fibres woven on FIG. 13 shows the initial structure having both a lower layer and an upper layer of additional fibres and FIG. 14 shows a side-on perspective view of the structure of FIG. 13.

Also the core material may be surrounded by a solidified foam material. The foam material may be inorganic or organic and the preferred foam materials are based on polyurethanes, phenolic resins, and urea formaldehyde resins. The foams may be formed in situ from the appropriate reactive chemical components or by other suitable techniques. The use of foam with the core material may yield advantages of improved load transfer, compressive properties, thermal insulation, sound absorption and fire barrier properties.

I claim:

1. Apparatus for fabricating a core material of resinated filaments comprising:
    filament supply means;
    a plurality of linearly arranged filament locating means;
    a plurality of rods spaced apart and substantially parallel to the filament locating means, the rods having at least one filament receiving hole and said rods being displaceable parallel to the plane of the filament locating means; and
    means for maintaining said filaments, displaced by said rods, at a desired separation.

2. Apparatus according to claim 1 in which the means for maintaining said displaced filaments at a desired separation comprise a set of formers having pins locatable between separated filaments upon displacement by the rods.

3. Apparatus according to claim 2 in which the formers are shaped so as to facilitate close packing.

4. Apparatus according to claim 1 in which the filament locating means are attachment points.

5. Apparatus according to claim 1 in which the filaments of the filament supply are glass fibre.

6. Apparatus according to claim 1 further comprising means for wetting the filaments.

7. Apparatus according to claim 6 in which the means for wetting the filaments comprises a chamber containing a wetting material.

8. Apparatus according to claim 7 in which the wetting material is a polyester resin, organic or chemical glue, paint, plastics material, epoxy resin, phenolic resin, or inorganic resin.

9. Apparatus according to claim 1 in which the filaments of the filament supply are carbon fibres.

10. Apparatus according to claim 1 in which the filaments of the filament supply are aramid fibres.

11. Apparatus according to claim 1 in which the filaments of the filament supply are textile rovings.

12. Apparatus according to claim 1 in which the filaments of the filament supply are filaments of metal.

* * * * *